(12) United States Patent
Takano

(10) Patent No.: US 9,297,153 B2
(45) Date of Patent: Mar. 29, 2016

(54) WATER SAVING AERATOR

(76) Inventor: Masaaki Takano, Higashiosaka (JP)

( * ) Notice: Subject to any disclaimer, the term of this patent is extended or adjusted under 35 U.S.C. 154(b) by 592 days.

(21) Appl. No.: 13/260,034

(22) PCT Filed: Mar. 26, 2009

(86) PCT No.: PCT/JP2009/056852
§ 371 (c)(1),
(2), (4) Date: Oct. 18, 2011

(87) PCT Pub. No.: WO2010/109680
PCT Pub. Date: Sep. 30, 2010

(65) Prior Publication Data
US 2012/0024984 A1 Feb. 2, 2012

(51) Int. Cl.
*E03C 1/084* (2006.01)
*B05B 7/04* (2006.01)

(52) U.S. Cl.
CPC .............. *E03C 1/084* (2013.01); *B05B 7/0425* (2013.01)

(58) Field of Classification Search
CPC .............................. E03C 1/084; B05B 7/0425
USPC ........... 239/423, 424, 425.5, 428.5, 429, 430, 239/431, 433, 434; 137/888
See application file for complete search history.

(56) References Cited

U.S. PATENT DOCUMENTS

| | | | |
|---|---|---|---|
| 4,153,204 A | 5/1979 | Aghnides | |
| 4,322,292 A * | 3/1982 | Knox | 239/428.5 |
| 4,484,710 A * | 11/1984 | Rozniecki | 239/290 |
| 4,869,103 A * | 9/1989 | Jerman | 73/198 |
| 5,826,799 A * | 10/1998 | Hsieh | 239/428.5 |
| 7,611,070 B2 * | 11/2009 | Paoluccio | 239/9 |

FOREIGN PATENT DOCUMENTS

| | | |
|---|---|---|
| DE | 1038531 | 9/1958 |
| EP | 0429068 | 5/1991 |
| EP | 2345765 | 7/2011 |

(Continued)

OTHER PUBLICATIONS

Supplemental European Search Report, Oct. 22, 2014; European Patent Application No. EP 09842291.8.

(Continued)

*Primary Examiner* — Ryan Reis
(74) *Attorney, Agent, or Firm* — Hamre, Schumann, Mueller & Larson, P.C.

(57) ABSTRACT

The present invention provides a water saving aerator that can generate high quality babble foam water including the fine bubble entirely. The water saving aerator is attached to the water facilities such as the water tap for generating bubble foam water and flowing the bubble foam water. The water saving aerator comprises a water flow forming portion 110 for forming the water flow through the water saving aerator; a ventilation pass 120 for supplying the outer air to the water flow from the side direction via an air intake hole 121 installed on the side surface of a water flow cylinder; and a water flow accelerator 111 for accelerating the water flow supplied from the water flow forming portion and jetting an accelerated water flow jet. The accelerated water flow jet accelerated by the water flow accelerator 111 is jetted to the air supplied from the air intake hole 121, the bubble foam water flow is generated by mixing the air supplied from the air intake hole 121 into the water flow by the force generated by the accelerated water flow jet.

12 Claims, 12 Drawing Sheets

(56) References Cited

FOREIGN PATENT DOCUMENTS

| | | |
|---|---|---|
| GB | 698691 | 10/1953 |
| JP | U 50-58553 | 5/1975 |
| JP | 03-008940 | 1/1991 |
| JP | 03-165855 | 7/1991 |
| JP | 04-007051 | 1/1992 |
| JP | 2007-089710 | 4/2007 |
| JP | 2008-297862 | 12/2008 |

OTHER PUBLICATIONS

Chinese Office Action, May 10, 2013; Chinese Patent Application No. 200980158172.9.

Chinese Office Action, Feb. 25, 2014; Chinese Patent Application No. 200980158172.9.

Chinese Office Action, 128 Jul. 2014; Chinese Patent Application No. 200980158172.9.

* cited by examiner

Bubble foam water flow

WATER SAVING AERATOR

TECHNICAL FIELD

This invention relates to a water saving aerator attached to water delivery devices such as a water tap (including a general water tap and a special purpose water tap for laboratory use) and a shower head for saving the amount of the water flow and aerating the water for generating bubble foam water.

BACKGROUND ART

Bubble foam water is required in many water taps including ordinary homes and in commercial facilities. The impression form use of the bubble foam water in washing is quite gentle. Therefore the bubble foam water is preferably used in washing glasses and the dishes because there is no possibility to a crack or damage the surface of the glasses and the dishes. The bubble foam water has little rebounding even if it hits the surface of the glasses and the dishes in washing, so there is no fear of splashing water around the sink and deteriorating the environment. Therefore, the bubble foam water preferably is used in many water taps not only in ordinary homes but also in the station, in the public facilities, in the laboratory in the research institute, and so on.

In the prior art, one of the methods for making the bubble foam water is attaching a water saving aerator to the water delivery devices such as a water tap. The water saving aerator in the prior art comprises air intake holes for in taking outer air to the water flow as a basic structure. The outer air is mixed with the water flow via the air intake holes. In addition, the opening of the water delivery devices is covered by the net for cutting the water flow into small pieces. The bubble foam water is generated by mixing the outer air via air intake hole and cutting the water flow by installing several nets to the opening of the water delivery devices for cutting the water flow into small pieces.

DISCLOSURE OF THE INVENTION

The Problems to be Solved

The conventional water saving aerator described in the prior art has the following problem. The conventional water saving aerator can generate the bubble foam water including rough bubble, but it cannot generate the bubble foam water including a high quality fine bubble. The conventional water saving aerator supplies the outer air from the air intake holes located on the side wall to the water flow, so the outer air is mixed roughly in to the running water flow by being introduced from the side direction. The size of the involved bubble water is about several millimeters. After being introduced into water flow, the bubble is cut by a net or several nets into small pieces according to the water flow cutting. The bubble foam water is generated in this manner.

However, the conventional water saving aerator described in the prior art generates the bubble foam water by mixing roughly the outer air into water flow only at the position where the outer air is supplied from the side direction. In addition, the hole of the net is about several millimeters as expected and cannot generate fine bubble smaller than the hole of the net.

The first approach for generating the fine bubble foam in the conventional water saving aerator is based on increasing the contact area for outer air and water flow. However, it is impossible to increase the contact area in the horizontal direction if the outer air is supplied from the side direction to the water flow. It is possible to increase the contact area in the vertical direction since the length of the contact area with the air becomes large to the extent that the height of the water fall becomes large. Therefore, the amount of the mixing air becomes large. However, the vertical length of the apparatus becomes too large as the bubble foam water saving aerator to be attached to the water tap.

The second approach for generating the fine bubble foam in the conventional water saving aerator is based on decreasing the mesh size of the net. However, the smaller the mesh size of the net becomes, the larger the resistance to the water flow becomes. The bubble mixed in the bubble foam water larger than the mesh size of the net in the upper stream is difficult to pass through the mesh of the net. If the mesh size of the net reaches the sub-millimeter level, there is a risk that the bubble is blocked and remains inside of the water tap, and that the air intake via the air intake hole is obstructed. In addition, if the mesh size of the net reaches the sub-millimeter level, there is a risk that the suspended particle and contaminant remains and blocks the mesh of the net.

Means for Solving the Problems

Therefore, it is an object of the present invention to provide a water saving aerator that can generate the high quality babble foam water including the fine bubble entirely.

In order to achieve the above-mentioned object, the present invention of a water saving aerator adapted to be attached to the water tap for generating bubble foam water and flowing the bubble foam water comprises; a water flow forming portion for forming the water flow through the water saving aerator; a ventilation pass for supplying the outer air to the water flow from the side direction via an air intake hole installed on the side surface of a water flow cylinder; a water flow accelerator for accelerating the water flow supplied from the water flow forming portion and jetting an accelerated water flow jet. The accelerated water flow jet accelerated by the water flow accelerator is jetted to the air supplied from the air intake hole, and the bubble foam water flow is generated by mixing the air supplied from the air intake hole into the water flow with the force generated by the accelerated water flow jet.

According to the above-mentioned configuration of the invention of the water saving aerator, the water saving aerator can generate high quality bubble foam water and flow the bubble foam water by mixing the air jetted from the air intake hole into the water flow jet due to the decrease of the air pressure around the air intake hole by jetting out the accelerated water flow jet below in very high speed.

The present inventor Masaaki TAKANO has studied and conducted the actual experiment repeatedly. He has confirmed that the air becomes fine bubble by being introduced and injected into the accelerated water flow jet at very high speed because the air jet is jetted accelerated by the air pressure generated by the accelerated water jet, and has confirmed that the high quality bubble foam water including fine bubble entirely can be generated.

It is possible to obtain the air cavity in the water flow cylinder by narrowing down the width of the accelerated water jet smaller than that of the width of the water flow cylinder that supplies the jetting space for the accelerated water flow jet. The intake air is jetted via the air intake hole into the air cavity due to the decrease of the air pressure of the air cavity around the air intake hole by jetting out the accelerated water flow jet below in very high speed; and the bubble foam water flow is generated.

The quality of the bubble included in the bubble foam water flow can be adjusted by modifying the distance and skew between the accelerated water jet and the air intake hole installed in the side surface of the water flow cylinder. Because the air jet is jetted from the air intake hole at high speed, the velocity of the air jet jetted from the air intake hole can be adjusted by the air pressure decrease depending on the positional relationship between the accelerated water jet and the air intake hole, in addition, the velocity of the air jet jetted from the air intake hole can be adjusted by the air pressure decrease depending on the angle relationship between the skew of the accelerated water jet and the installation angle of the air intake hole to the water flow cylinder.

Therefore, it is preferable that the water saving aerator further comprises an accelerated water flow jet position adjusting mechanism for adjusting the distance between the air intake hole and the accelerated water flow jet jetted into the air cavity.

It is also preferable that the water saving aerator further comprises an accelerated water flow jet skew adjusting mechanism for adjusting the jet skew of the accelerated water flow jet jetted into the air cavity.

It is also preferable that the water saving aerator further comprises an air intake hole size adjusting mechanism for adjusting the width of the air intake hole and adjusting the velocity of the air flow jet jetted via the air intake hole, wherein the velocity of the air jetted into the accelerated water flow jet can be adjusted.

It is also preferable that the water saving aerator can adjust the skew of the ventilation pass to the side surface of the water flow cylinder.

For example, the skew of the air flow jet to the accelerated water flow jet can be adjusted to be larger than 0 degree and smaller than 90 degrees.

For example, the skew of the air flow jet to the accelerated water flow jet can be adjusted to be larger than 90 degree and smaller than 180 degrees.

It is also preferable that the water saving aerator further comprises a ventilation pass skew adjusting mechanism for adjusting the skew of the ventilation pass to the side surface of the water flow and the skew of the air flow jet to the accelerated water flow jet without fixing the skew of the ventilation pass to the side surface of the water flow.

It is also preferable that the water saving aerator further comprises a water flow cylinder width adjusting mechanism for adjusting the width of the water flow cylinder installed to the water flow forming portion. The adjustment can be done in the attached condition to the water tap; wherein the width of the accelerated water flow jet can be adjusted by operating the water flow cylinder width adjusting mechanism. The mixing status in the bubble foam water flow can be adjusted by adjusting the width of the accelerated water flow jet.

The water saving aerator of the present invention utilizes the accelerated water flow jet. If the speed of the accelerated water flow jet is too fast to use, the user of the bubble foam water in washing may feel pain, and the water flow may hit and rebound from the object so that water drops are splashed around even though the water flow is generated as the bubble foam water flow. Therefore, the water saving aerator further comprises a decelerator for decelerating the speed of the accelerated water flow jet accelerated by the accelerator and for leading to the lower stream. The speed of the flow of the generated bubble foam water can be adjusted.

The number of the accelerated water flow jet may as one or more.

According to the above-mentioned configuration of the invention of the water saving aerator, the air can be injected from the air intake hole and the bubble foam water flow can be generated by decreasing the air pressure around the air intake hole. The air pressure can be adjusted by accelerating the water flow flowing in the water saving aerator by the accelerator.

According to the above-mentioned configuration of the invention of the water saving aerator, the air cavity can be supplied in the water flow cylinder by narrowing the width of the accelerated water flow jet smaller than that of the water flow cylinder. The accelerated water flow to be jet is jetted into the air cavity, and the air in the air cavity is introduced and be jetted with the accelerated water flow jet below at very high speed. As a result, the air pressure of the air cavity decreases, the air is jetted from the air intake hole and the bubble foam water flow is generated.

The quality of the bubble included in the bubble foam water flow can be adjusted by adjusting the distance and skew between the accelerated water jet and the air intake hole installed in the side surface of the water flow cylinder. The velocity of the air jet jetted from the air intake hole can be adjusted by the positional relationship between the accelerated water jet and the air intake hole. In addition, the velocity of the air jet jetted from the air intake hole can be adjusted by the angle relationship between the skew of the accelerated water jet and the installation angle of the air intake hole to the water flow cylinder.

DETAILED DESCRIPTION OF THE PREFERRED EMBODIMENT

Some embodiments of a water saving aerator according to the present invention are described below with reference to the relevant drawing. Needless to add, the claims of the present invention include but are not limited to the application, configuration, or quantity shown in the following embodiments.

(Embodiment 1)

A schematic view of the water saving aerator 100 is shown as an example of this embodiment 1. The water saving aerator 100 shown in Embodiment 1 can save water and generate the bubble foam water.

Figure 1:
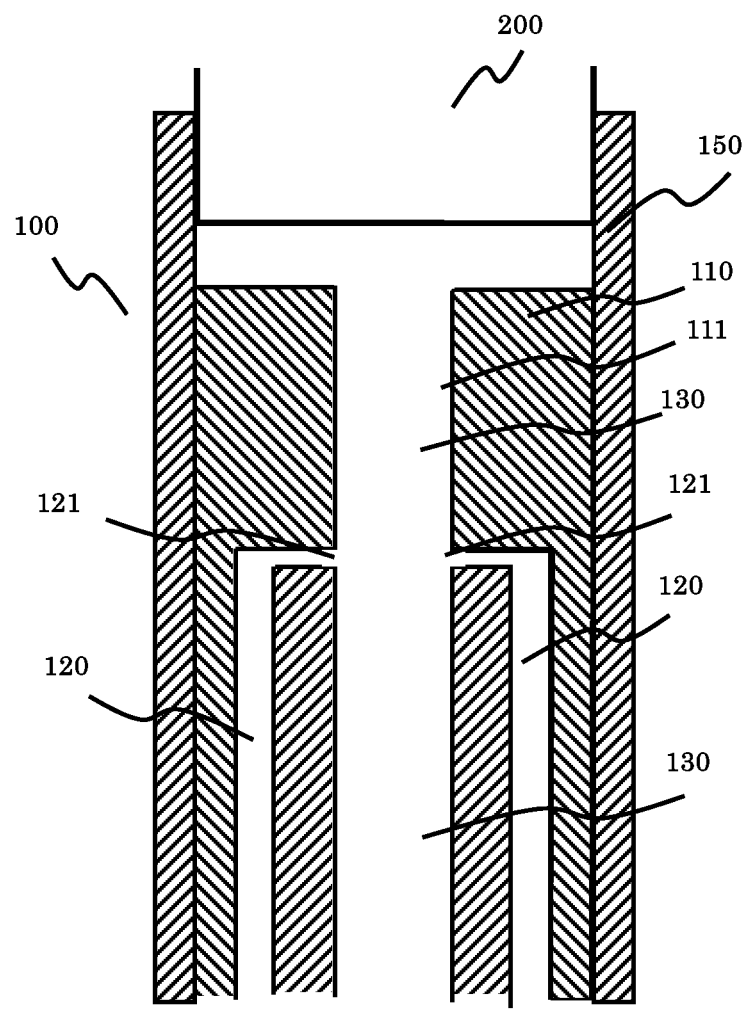
FIG. 1 is a schematic view of the water saving aerator 100 of the present invention in embodiment 1.

FIG. 1 is a schematic view of the water saving aerator 100 of the present invention.

The water saving aerator 100 is attached to the water delivery device 200 such as a water tap and generates the water flow as the bubble foam water flow.

As shown in FIG. 1, the water saving aerator 100 of the present invention includes the water flow forming portion 110, the ventilation pass 120, the water flow cylinder 130 and the attachment 150.

In FIG. 1, all components are shown in the cross-section view for ease of understanding.

The water flow forming portion 110 is the portion for forming the water flow flowing in the water saving aerator 100. In this configuration, the water flow forming portion 110 includes the water flow accelerator 111 for accelerating the water flow. The structure for accelerating the water flow is not limited. The exemplary configuration of the water flow accelerator 111 shown in FIG. 1 employs the structure for narrowing the width of the water flow at the accelerating position and the velocity of the water flow becomes large. In this configuration, the upper surface of the water flow accelerator 111 covers the opening of the water tap. The water flow accelerator 111 comprises a small through-hole in the center simply, and the center through-hole works as the water flow cylinder 130. The water flow accelerator 111 accepts the width A of the water flow from the attachment 150 and narrows the width B of the water flow for accelerating the water flow.

In this embodiment, the accelerated water flow is jetted in a pole shape. However, the accelerated water flow is not limited to the pole shape, and the accelerated water flow can be formed as various shape according to the shape of the water flow forming portion 110 and the water flow accelerator 111.

The water saving effect can be obtained by employing the above-mentioned water flow accelerator 111. The water saving effect can be obtained by narrowing the width of the water flow with the water flow accelerator 111 to be smaller than that of the water flow cylinder 130.

The attachment part 150 is a cylinder shape object attached to the water delivery devices 200 for connecting the water delivery devices 200 and the water flow forming portion 110. The attachment part 150 holds the water flow forming portion 110

The internal diameter of the attachment part 150 is roughly the same as the outer diameter of the water delivery devices 200. The attachment part 150 is the device for attaching the water delivery devices 200. In this configuration, the attachment part 150 comprises screws for fastening to the water delivery devices 200. The screws in the attachment part 150 and the male screw installed around the water delivery devices 200 are screwed together, and the water saving aerator 100 is fastened to the water delivery devices 200 without leaking water.

It is necessary to use the appropriate figure and size corresponding to that of the opening of the water delivery devices 200 such as the water tap. However the opening of most water delivery devices 200 such as the water tap is standardized according to its use. For example, the water taps used in the public facilities such as the laboratory and the research institute are standardized in the same shape and in the same size.

The ventilation pass 120 is the air pass that leads to the outer air. The air intake holes 121 are installed on the side surface of the water flow cylinder 130, and the outer air is supplied through the air intake holes 121 from the side surface of the water flow cylinder 130. In this configuration, the air intake holes 121 are installed on the side surface of the water flow cylinder 130 where velocity of the water flow becomes large due to the water flow accelerator 111. The air is supplied through the air intake holes 121 to the accelerated water flow jet jetted by the water flow accelerator 111, the air is introduced by the force given by the accelerated water flow jet, and the bubble foam water flow is generated.

The air pressure around the air intake holes 121 decreases a lot because of the force given by the accelerated water flow jet to the lower stream, and the air is vacuumed and jetted via the air intake holes from the ventilation pass 120. The air is injected at the very fast speed to the accelerated water flow jet.

The faster the velocity of the accelerated water flow jet becomes, the faster the velocity of the injected air jet to the accelerated water flow jet becomes, and the mixing of the water and the air is achieved. The air injected from the side surface of the accelerated water flow jet spreads and diffuses inside the water flow, the bubbles become fine and the high quality bubble foam will be obtained.

Figure 2:
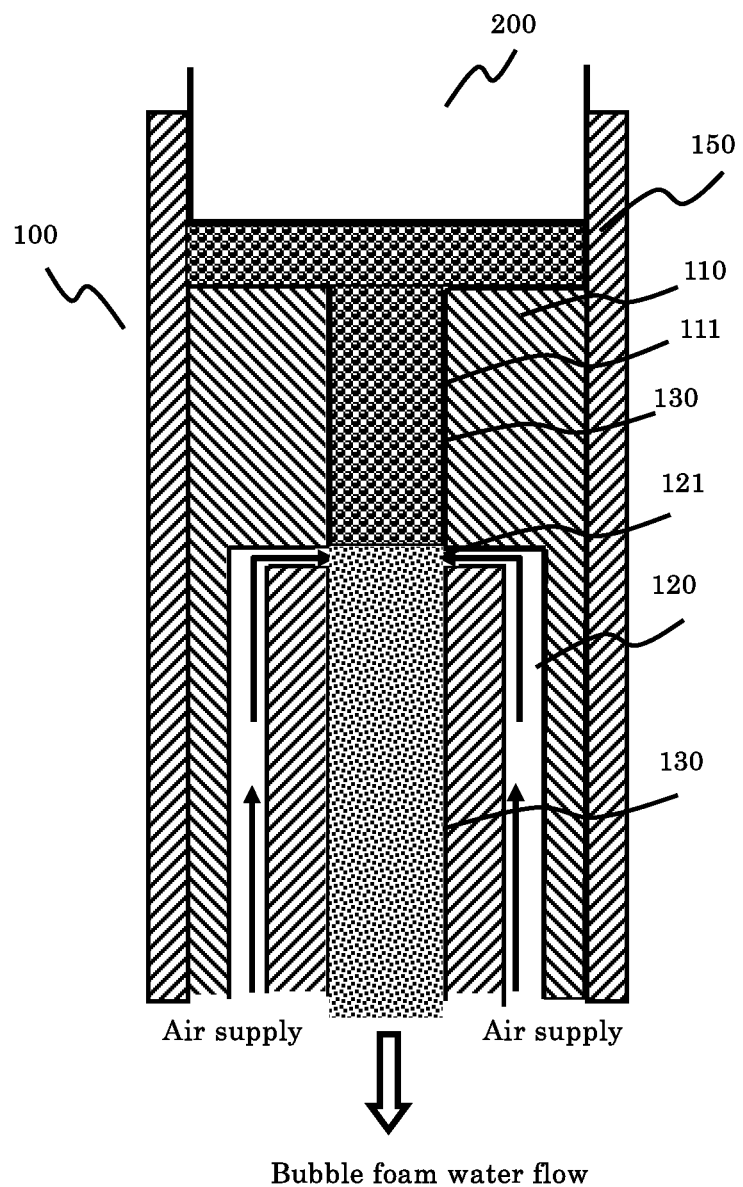
FIG. 2 is a schematic view showing the bubble foam water flow that is generated by flowing the water through the structure shown in FIG. 1.

FIG. 2 is a schematic view showing that the bubble foam water flow is generated by flowing the water through the structure shown in FIG. 1. The water flow, the air flow and the bubble foam water flow to be generated are shown illustratively.

The water flow from the upper stream turns into the bubble foam water flow at the position where the air intake holes 121 are installed because the air flow is jetted and injected into the water flow and the fine bubble are mixed.

If the velocity of the water flow becomes larger by narrowing the width of the water flow by operating the water flow accelerator 111, the air pressure around the air intake holes 121 decreases more and the velocity of the injected air flow jet becomes large. As a result, the amount of the bubbles injected to the water flow becomes large and the bubble size becomes finer.

According to the water saving aerator 100 of the embodiment 1 of the present invention, high quality bubble foam water flow can be obtained by injecting the air flow jet from the ventilation pass by decreasing the air pressure around the air intake holes by accelerating the water flow jet by the water flow accelerator as shown above.

(Embodiment 2)

The water saving aerator employing the air cavity is shown as an example of this embodiment 2.

The water saving aerator 100a includes the air cavity 131 in the water flow cylinder 130. In this configuration, the width of the accelerated water flow jet is narrowed to be smaller than that of the water flow cylinder 130. The air pressure around the air intake holes facing the air cavity 131 is decreased by jetting the accelerated water flow jet into the air cavity, and the air is vacuumed and jetted through the air intake holes 121 to generate the bubble foam water flow.

Figure 3:
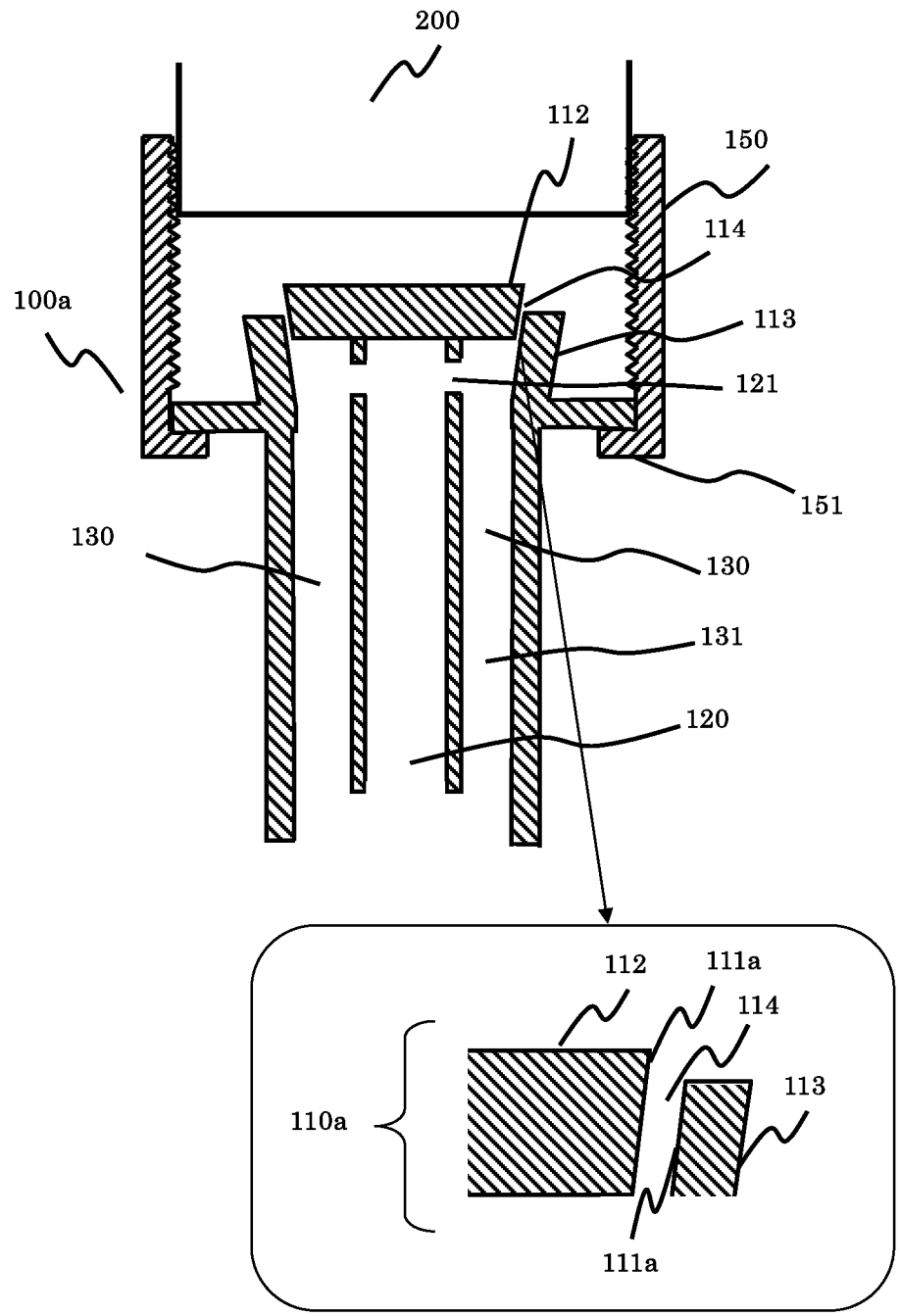
FIG. 3 is a schematic view of the water saving aerator 100a of the present invention in embodiment 2.

FIG. 3 is a schematic view of the water saving aerator 100a of the present invention in embodiment 2. The same as FIG. 1, all components are shown in cross-section for ease of understanding. Actually, the water saving aerator 100a is a solid of revolution shape.

As shown in FIG. 3, the water flow forming portion 110a is installed beneath the attachment part 150, and the accelerated water flow jet is jetted by the water flow accelerator 111a.

In the configuration shown in FIG. 3, the cone shape object 112 faces the inverted cone shape cylinder 113 in vertical direction. These are not contacted directly; these are facing with a certain gap 114. The gap 114 is formed between the outer surface of the cone shape object 112 and the internal surface of the inverted cone shape cylinder 113. This gap 114 is used as the water flow forming portion in the water saving aerator 100a.

In FIG. 3, the cone shape object 112 and the ventilation pass 120 are shown above the inverted cone shape cylinder 113. However, the cone shape object 112 and the ventilation pass 120 are supported by the supporting object (not shown in Figure).

The same as embodiment 1, the attachment part 150 is a cylinder shape object attached to the water delivery devices 200 for connecting the water delivery devices 200 and the water flow forming portion 110a. The attachment part 150 holds the water flow forming portion 110a.

Figure 4:
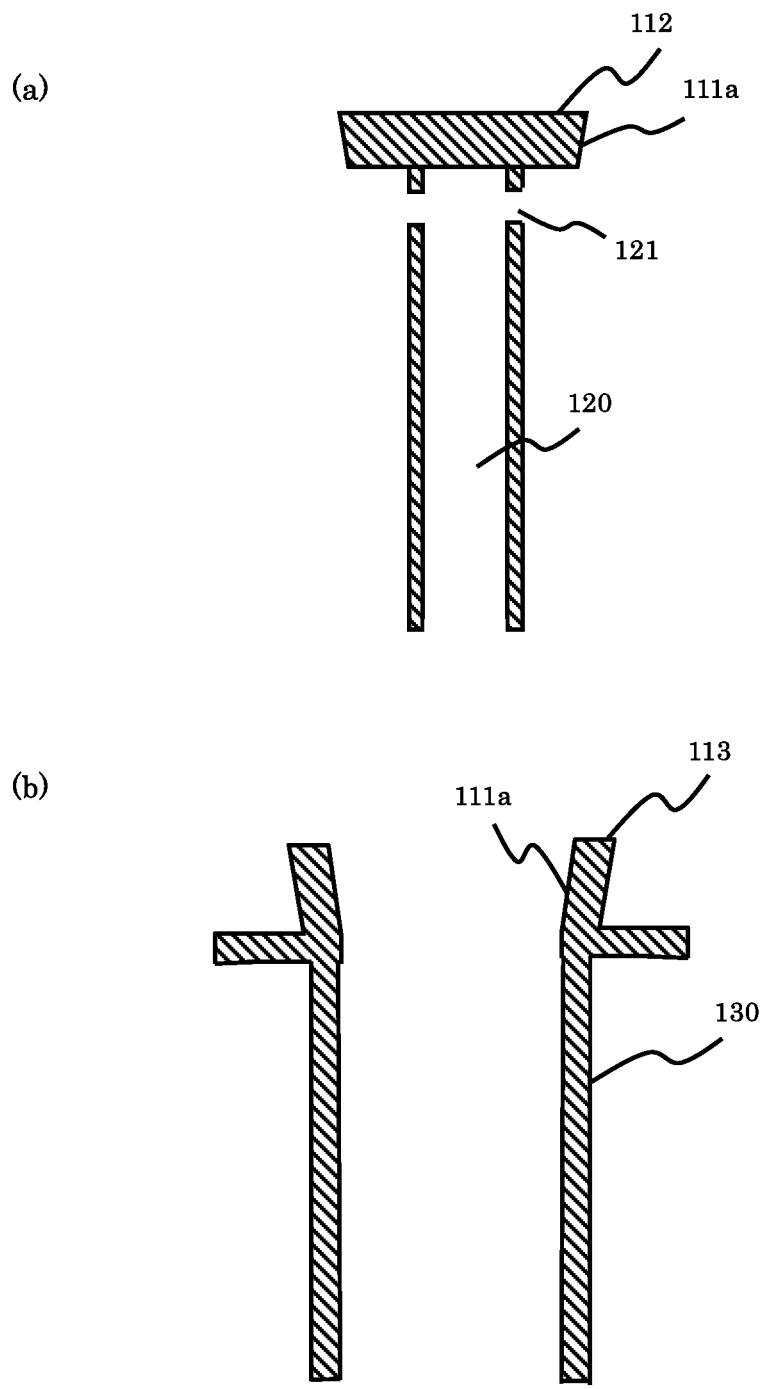
FIG. 4 is an exploded view showing the water flow forming portion 110a for ease of understanding.

FIG. 4 is an exploded view showing the water flow forming portion 110a for ease of understanding.

FIG. 4 shows in a cross-sectional view. Most components are the solid of revolution shape, but the air intake holes 121 are not the solid of revolution shape. Pluralities of the air intake holes 121 are formed in the side surface of the water flow cylinder to the ventilation pass 120. The water flow accelerator 111a of the water flow forming portion 110a is formed by the combination of the outer surface of the cone shape object 112 and the internal surface of the inverted cone shape cylinder 113, and the gap 114 between these two objects works as the water flow of this water saving aerator 100a.

FIG. 4(a) is a schematic view showing the cone shape object 112 and the ventilation pass 120. The ventilation pass 120 is a pipe shape pass. The air intake holes 121 are the holes on the side surface of the ventilation pass 120.

FIG. 4(b) is a schematic view showing the inverted cone shape cylinder 113 and the water flow cylinder 130. The water flow cylinder 130 is a cylinder shape object.

The water flow is accelerated when passing this gap 114 because the width of the gap 114 is smaller than that of the attachment part 150.

In this configuration, the accelerated water flow jet formed by the water flow forming portion 110a is jetted as the cylindrical shape, in other words, a belt like round shape. The shape of the accelerated water flow jet is not limited to such a cylindrical shape, and the accelerated water flow can be formed as various shape according to the shape of the water flow forming portion 110a and the water flow accelerator 111a.

In this configuration, as shown in FIG. 3, a part of the space in the water flow cylinder 130 beneath the water flow accelerator 111a is used as the air cavity 131 always filled with air even if the water is running through the water saving aerator 100a. In this configuration, the width A of the water flow cylinder 130 beneath the water flow accelerator 111a is larger than the width B of the accelerated water flow jet, and the accelerated water flow jet can be jetted from the water flow accelerator 111a into the air contained in the air cavity 131 at high speed.

Figure 5:
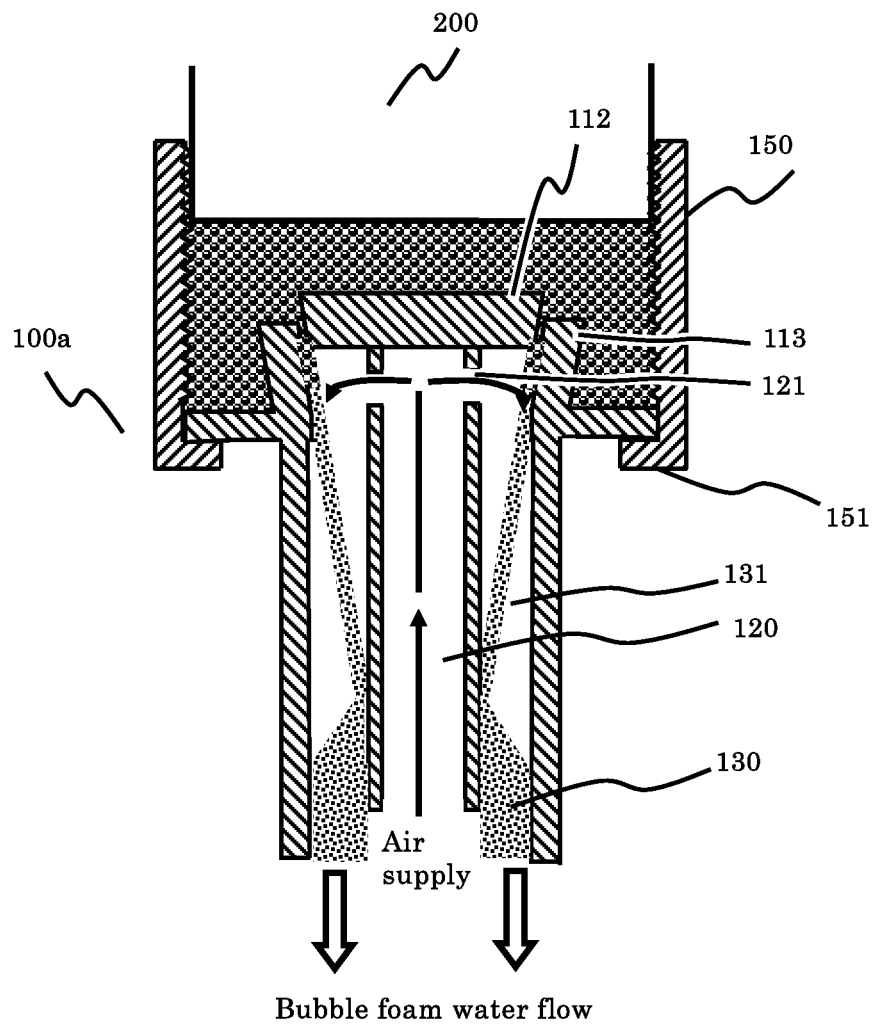
FIG. 5 is a schematic view showing the bubble foam water flow that is generated by flowing the water through the water saving aerator 100a of the present invention in embodiment 2.

FIG. 5 is a schematic view showing the bubble foam water flow that is generated by flowing the water through the water saving aerator 100a of the present invention in embodiment 2.

The water is accepted via the attachment 150 and led to the gap 114 of the water flow forming portion 110a, and the water flow is accelerated when passing the gap 114. The accelerated water flow is jetted into the air cavity 131 filled with the air. In this configuration, the width of the water flow cylinder 130 is larger than that of the accelerated water flow, so the air cavity can keep on containing the air. There are air intake holes 121 beneath the gap 114.

The accelerated water flow jet is jetted into the air cavity 131 filled with the air, and the accelerated water flow jet goes downstream, introducing the air in the air cavity. A part of the air in the air cavity 131 is flushed away, and the air pressure in the air cavity 131 is decreased. The air intake holes 121 are installed on the side surface of the air cavity 131, and the air pressure decrease occurs around the air intake holes 121, so the air pressure around the air intake holes 121 is decreased. The air intake holes 121 are connected to the outer air through the ventilation pass 120. The air is vacuumed from the outer air through the ventilation pass 120 into the air cavity at high speed. The velocity of the air flow jet depends on the diameter of the air intake holes 121, in this configuration, the velocity of the air flow jet jetted from the air intake holes 121 becomes large if the air is vacuumed into the air cavity at high speed. In this configuration, the accelerated water flow jet is jetted near the air intake holes 121, so the air flow jet is injected to the accelerated water flow jet.

The air cavity 131 is filled with the air, and the accelerated water flow jet is jetted into the air contained in the air cavity. In addition, the air flow jet is jetted via the air intake holes 121 from the side direction, the air is injected into the accelerated water flow jet and bubbles are diffused entirely. As a result, the high quality bubble foam water flow is generated.

In FIG. 5, the water flow after turning into the bubble foam water flow is hatched with fine hatching finer than the hatching used for the water flow before turning into the bubble foam water flow.

The configuration shown above is the basic structure of the water saving aerator 100a employing the air cavity 131.

Next, the adjustments on various conditions such as the distance between the accelerated water flow jet jetted into the air cavity 131 and the air intake holes 121, the angle of the accelerated water flow jetted into the air cavity 131, the width of the air intake holes and the installation angle of the air intake holes (the angle of the air flow jet jetted from the air intake holes 121 to the accelerated water flow jet) are described.

First, the configuration including the accelerated water flow jet position adjusting mechanism is described. It is used for adjusting the distance between the accelerated water flow jet jetted into the air cavity 131 and the air intake holes 121.

Figure 6:
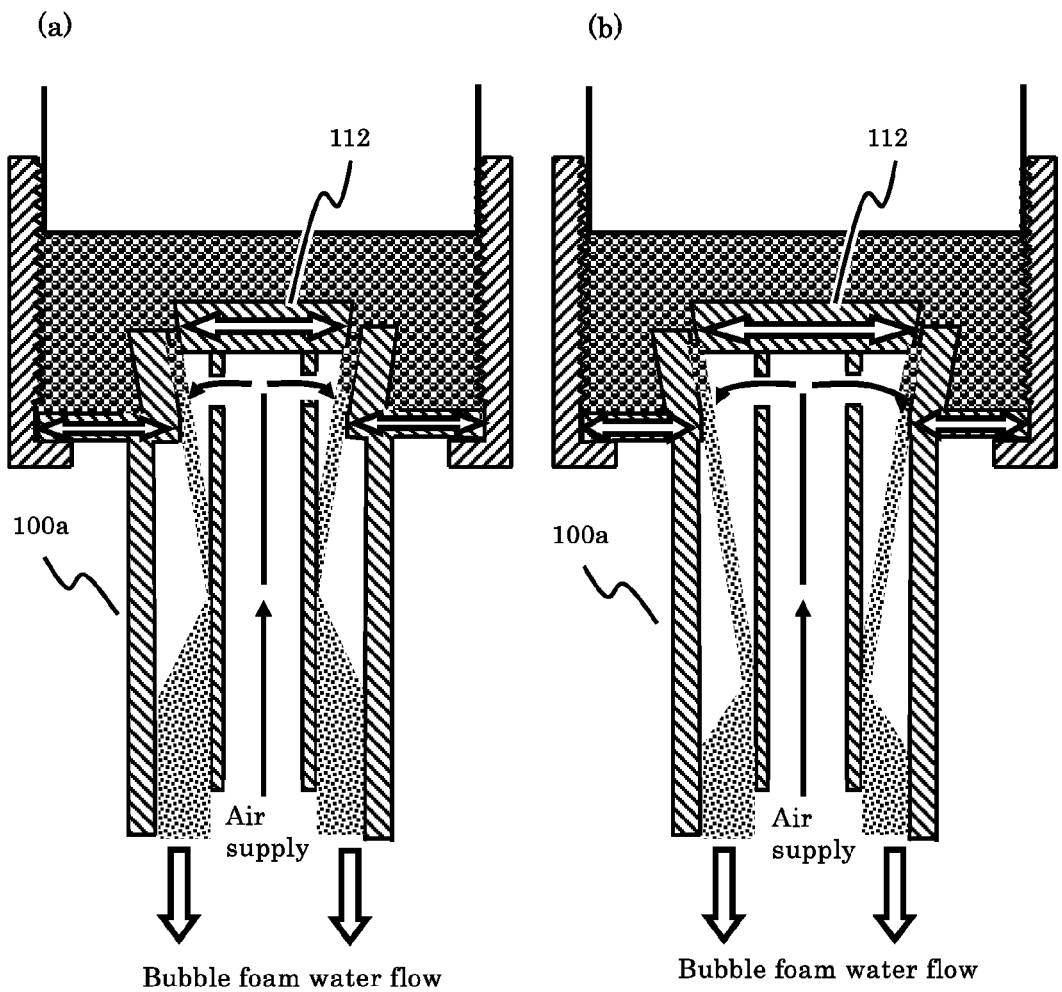
FIG. 6 is a schematic view of the configuration including the accelerated water flow jet position adjusting mechanism.

FIG. 6 is a schematic view of the configuration including the accelerated water flow jet position adjusting mechanism.

In FIG. 6, the water flow after turning into the bubble foam water flow is hatched with fine hatching finer than the hatching used for the water flow before turning into the bubble foam water flow.

The accelerated water flow jet position adjusting mechanism is formed in the water flow forming portion 110a. It can adjust the position of the accelerated water flow jet to be formed by the water flow accelerator 111a, as a result, the distance between the accelerated water flow jet and the air intake holes 121 is adjusted. The method for adjusting the position of the accelerated water flow jet to be formed and adjusting the distance between the accelerated water flow jet and the air intake holes 121 is not limited, but in this configuration, the accelerated water flow jet position adjusting mechanism can adjust the position of the water flow forming portion 110a and the water flow accelerator 111a. In FIG. 6, the detailed structure of the accelerated water flow jet position adjusting mechanism is not shown, but it can move the object forming the gap 114 to the center position and to the peripheral position as shown by the arrows.

If the accelerated water flow jet position adjusting mechanism adjusts the position of the object forming the gap 114 from that shown in FIG.6 (b) to FIG.6 (a), the position of the accelerated water flow jet is shifted in a center direction (near the air intake hole 121), and the distance between the accelerated water flow jet and the air intake hole 121 becomes smaller. If the accelerated water flow jet position adjusting mechanism adjusts the position of the object forming the gap 114 from that shown in FIG.6 (*a*) to FIG.6 (*b*), the position of the accelerated water flow jet is shifted in a peripheral direction (far from the air intake hole 121), and the distance between the accelerated water flow jet and the air intake hole 121 becomes larger.

When the air is jetted from the air intake holes 121 into the air cavity 131, the air contained in the air cavity 131 works as a resistance, so if the distance to the accelerated water flow jet becomes long, the velocity of the air flow jet decreases because of the resistance. Therefore, the velocity and the amount of the air flow jet in the air cavity can be controlled by adjusting the distance to the accelerated water flow jet.

As shown in FIG. 6(*a*), if the forming position of the accelerated water flow jet is shifted in a center direction and the distance to the air intake holes 121 becomes smaller, the velocity and the amount of the air flow jet from the air intake holes 121 increases and the amount of the bubbles mixed into the accelerated water flow jet becomes larger.

As shown in FIG. 6(*b*), if the forming position of the accelerated water flow jet is shifted in a peripheral direction and the distance to the air intake holes 121 becomes larger, the velocity and the amount of the air flow jet from the air intake holes 121 decreases and the amount of the bubble mixed into the accelerated water flow jet becomes smaller.

As shown above, the amount of bubble can be controlled by adjusting the forming position of the accelerated water flow jet with the accelerated water flow jet position adjusting mechanism.

The amount and the size of the bubbles mixed into the accelerated water flow jet depend on other conditions such as the amount of the water in the accelerated water flow jet, the velocity of the accelerated water flow jet, the width and the height of the air cavity 131 and the width of the air intake holes 121. Taking these conditions into account, the forming position of the accelerated water flow jet is adjusted with the accelerated water flow jet position adjusting mechanism. As a result, the amount and the size of the bubbles mixed into the accelerated water flow jet can be adjusted.

Next, the configuration including the accelerated water flow jet skew adjusting mechanism for adjusting the skew of the accelerated water flow jet jetted into the air cavity 131 is described.

Figure 7:
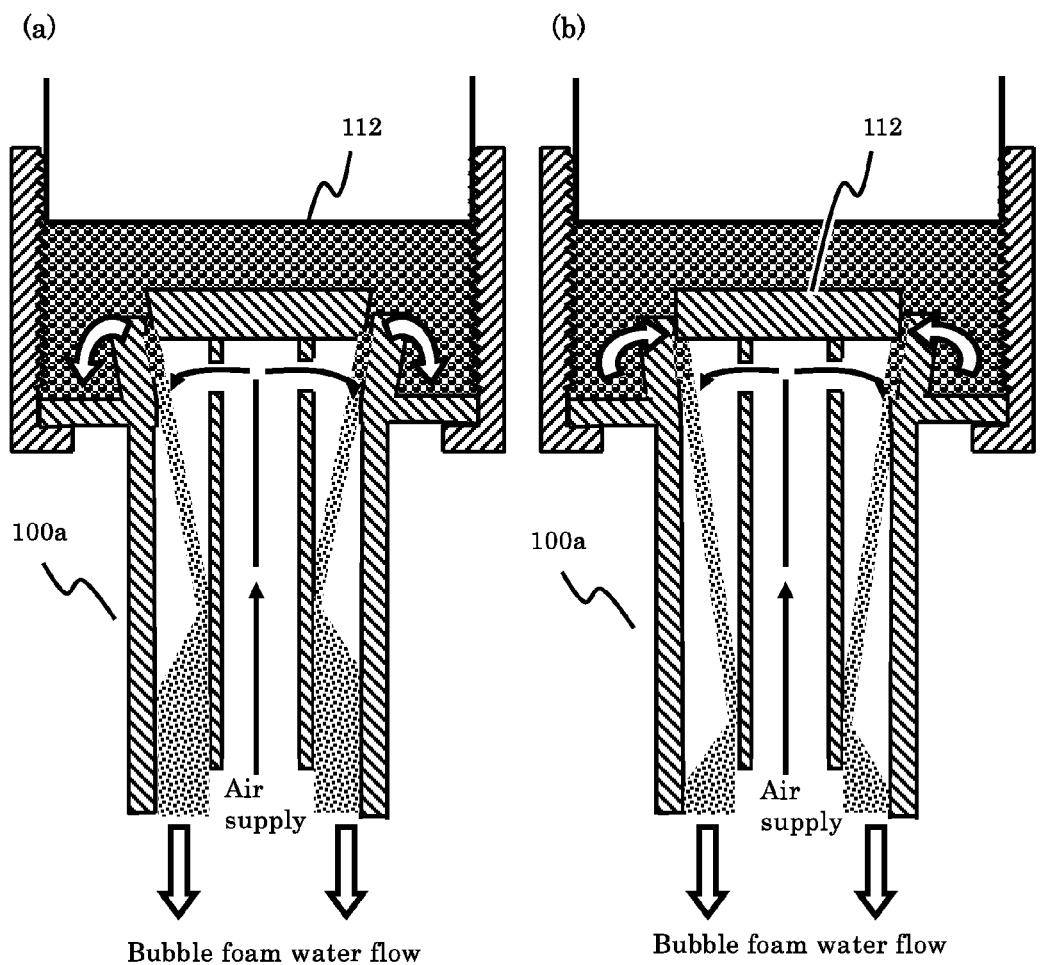
FIG. 7 is a schematic view of the configuration including the accelerated water flow jet skew adjusting mechanism.

FIG. 7 is a schematic view of the configuration including the accelerated water flow jet skew adjusting mechanism.

In FIG. 7, the water flow after turning into the bubble foam water flow is hatched with fine hatching finer than the hatching used for the water flow before turning into the bubble foam water flow.

The accelerated water flow jet skew adjusting mechanism is formed in the water flow forming portion 110*a*. It can adjust the skew of the accelerated water flow jet jetted by the water flow accelerator 111*a*. As a result, the distance and the skew relative to the air intake holes 121 can be adjusted. The methods for adjusting the skew of the accelerated water flow jet and the method for adjusting the distance to the air intake holes 121 are not limited, but in this configuration, the accelerated water flow jet skew adjusting mechanism can adjust the skew of the installation of the water flow forming portion 110*a* and the water flow accelerator 111*a*. In FIG. 7, the detailed structure of the accelerated water flow jet skew adjusting mechanism is not shown, but it can move the object forming the air intake holes 121 up and down and it can change the skew of the object forming the gap 114 as shown by the arrows.

If the accelerated water flow jet skew adjusting mechanism adjusts the skew of the object forming the gap 114 from that shown in FIG.7 (*b*) to FIG.7 (*a*), the position of the accelerated water flow jet is shifted in a center direction (near the air intake hole 121), and the distance between the accelerated water flow jet and the air intake hole 121 becomes smaller. If the accelerated water flow jet skew adjusting mechanism adjusts the position of the object forming the gap 114 from that shown in FIG.7 (*a*) to FIG.7 (*b*),the position of the accelerated water flow jet is shifted in a peripheral direction (far from the air intake hole 121), and the distance between the accelerated water flow jet and the air intake hole 121 becomes larger.

When the air is jetted from the air intake holes 121 into the air cavity 131, the air contained in the air cavity 131 works as a resistance, so if the distance to the accelerated water flow jet becomes long, the velocity of the air flow jet decreases because of the resistance. Therefore, the velocity and the amount of the air flow jet in the air cavity can be controlled by adjusting the moving distance of the accelerated water flow jet.

As shown in FIG. 7(*a*), if the skew of the accelerated water flow jet shifted in a center direction and the distance to the air intake holes 121 become smaller, the velocity and the amount of the air flow jet from the air intake holes 121 increase and the amount of the bubbles mixed into the accelerated water flow jet becomes larger.

As shown in FIG. 7(*b*), if the skew of the accelerated water flow jet shifted in a peripheral direction and the distance to the air intake holes 121 becomes larger, the velocity and the amount of the air flow jet from the air intake holes 121 decrease and the amount of the bubbles mixed into the accelerated water flow jet becomes smaller.

As shown above, the amount of bubble can be controlled by adjusting the skew of the accelerated water flow jet with the accelerated water flow jet skew adjusting mechanism.

The amount and the size of the bubble mixed into the accelerated water flow jet depend on other conditions such as the amount of the water in the accelerated water flow jet, the velocity of the accelerated water flow jet, the width and the height of the air cavity 131 and the width of the air intake holes 121. Taking these conditions into account, the skew of the accelerated water flow jet is adjusted with the accelerated water flow jet skew adjusting mechanism. As a result, the amount and the size of the bubble mixed into the accelerated water flow jet can be adjusted.

Next, the configuration including the air intake hole size adjusting mechanism for adjusting the width of the air intake holes 121 and adjusting the velocity of the air flow jet jetted via the air intake holes 121 is described.

Figure 8:
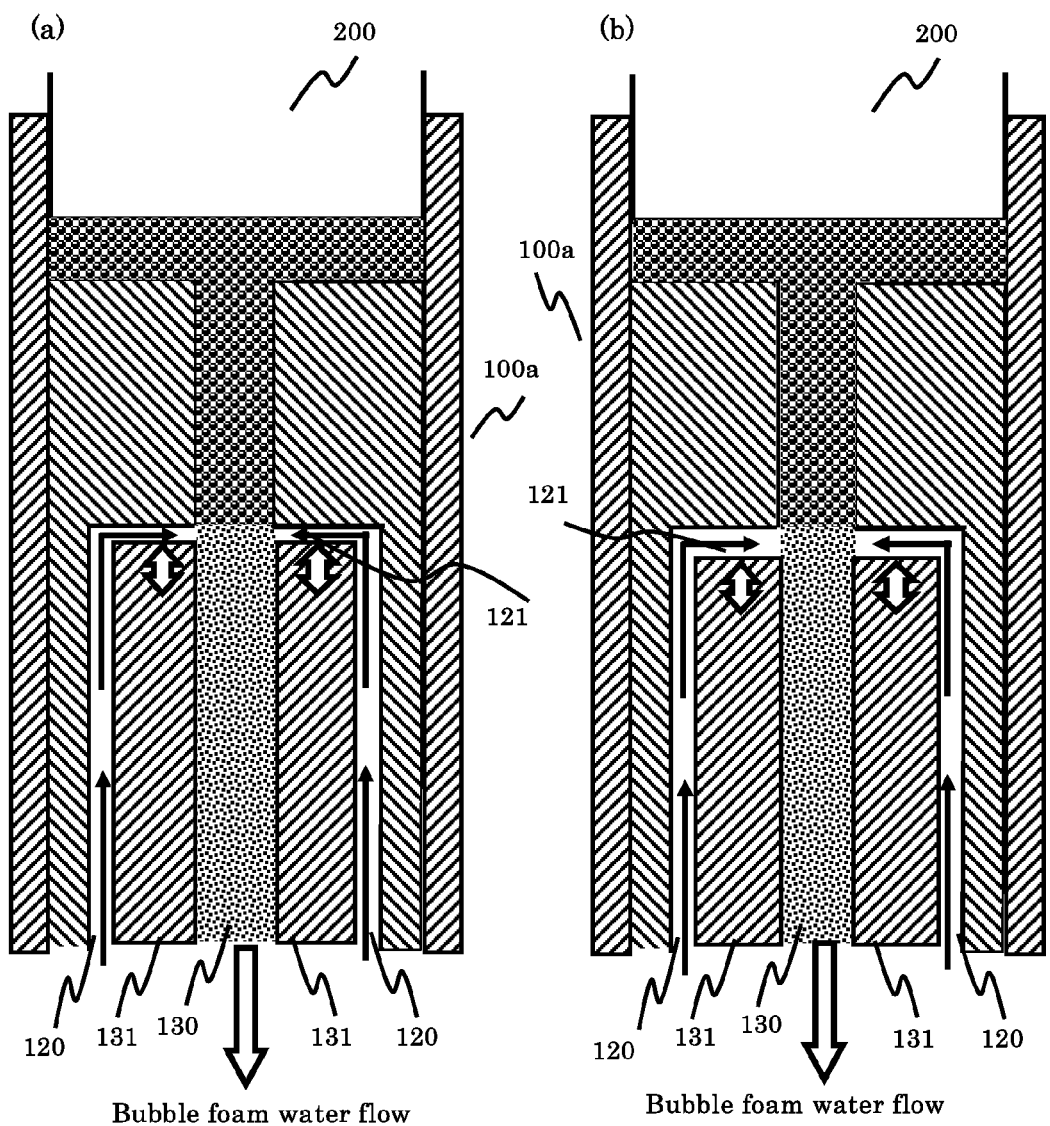
FIG. 8 is a schematic view of the configuration including the air intake hole size adjusting mechanism.

FIG. 8 is a schematic view of the configuration including the air intake hole size adjusting mechanism. In this configuration, the width of the air intake holes 121 can be adjusted.

In FIG. 8, the water flow after turning into the bubble foam water flow is hatched with fine hatching finer than the hatching used for the water flow before turning into the bubble foam water flow.

The air intake hole size adjusting mechanism can adjust the width of the air intake hole and adjust the velocity of the air flow jet jetted into the air cavity.

The methods for adjusting the width of the air intake holes 121 are not limited, but in this configuration, the air intake hole size adjusting mechanism can adjust the relative distance between the objects that form the air intake holes 121, and as a result, it can adjust the width of the gap between these objects. In FIG. 8, the detailed structure of the air intake hole size adjusting mechanism is not shown, but it can move the objects forming the air intake holes 121 up and down as shown by the arrows.

If the air intake hole size adjusting mechanism adjusts the width of the air intake holes as shown in FIG. 8(*a*) to FIG. 8(*b*), the width of the air intake holes 121 become large, and the air pass becomes large. Therefore, the velocity of the vacuumed air jet decreases when vacuuming the air into the air cavity 131 if the amount of the air to be vacuumed is the same.

If the air intake hole size adjusting mechanism adjusts the width of the air intake holes as shown in FIG. 8(*b*) to FIG. 8(*a*), the width of the air intake holes 121 becomes narrow, and the air pass becomes narrow. Therefore, the velocity of the vacuumed air jet increases when vacuuming the air into the air cavity 131 if the amount of the air to be vacuumed is the same.

The velocity of the air flow jet jetted from the air intake holes 121 into the air cavity shown in FIG. 8(*a*) becomes faster than that shown in FIG. 8 (*b*). As a result, the velocity and the amount of the air flow jet injected into the accelerated water flow jet becomes large, and the bubble mixed in the accelerated water flow jet becomes large.

The velocity of the air flow jet jetted from the air intake holes 121 into the air cavity shown in FIG. 8(*b*) becomes slower that shown in FIG. 8(*a*). As a result, the velocity and the amount of the air flow jet injected into the accelerated water flow jet become small, and the bubble mixed in the accelerated water flow jet becomes small.

As shown above, the amount of bubbles can be controlled by adjusting the width of the air intake holes 121 with the air intake hole size adjusting mechanism.

The amount and the size of the bubble mixed into the accelerated water flow jet depend on other conditions such as the amount of the water in the accelerated water flow jet, the velocity of the accelerated water flow jet, the width and the height of the air cavity 131 and the width of the air intake holes 121. Taking these conditions into account, the width of air intake holes 121 is adjusted with the air intake hole size adjusting mechanism, and as a result, the amount and the size of the bubble mixed into the accelerated water flow jet can be adjusted.

Next, the configuration including the ventilation pass skew adjusting mechanism for adjusting the skew of the ventilation pass 120 relative to the side wall of the water flow cylinder is described.

Figure 9:
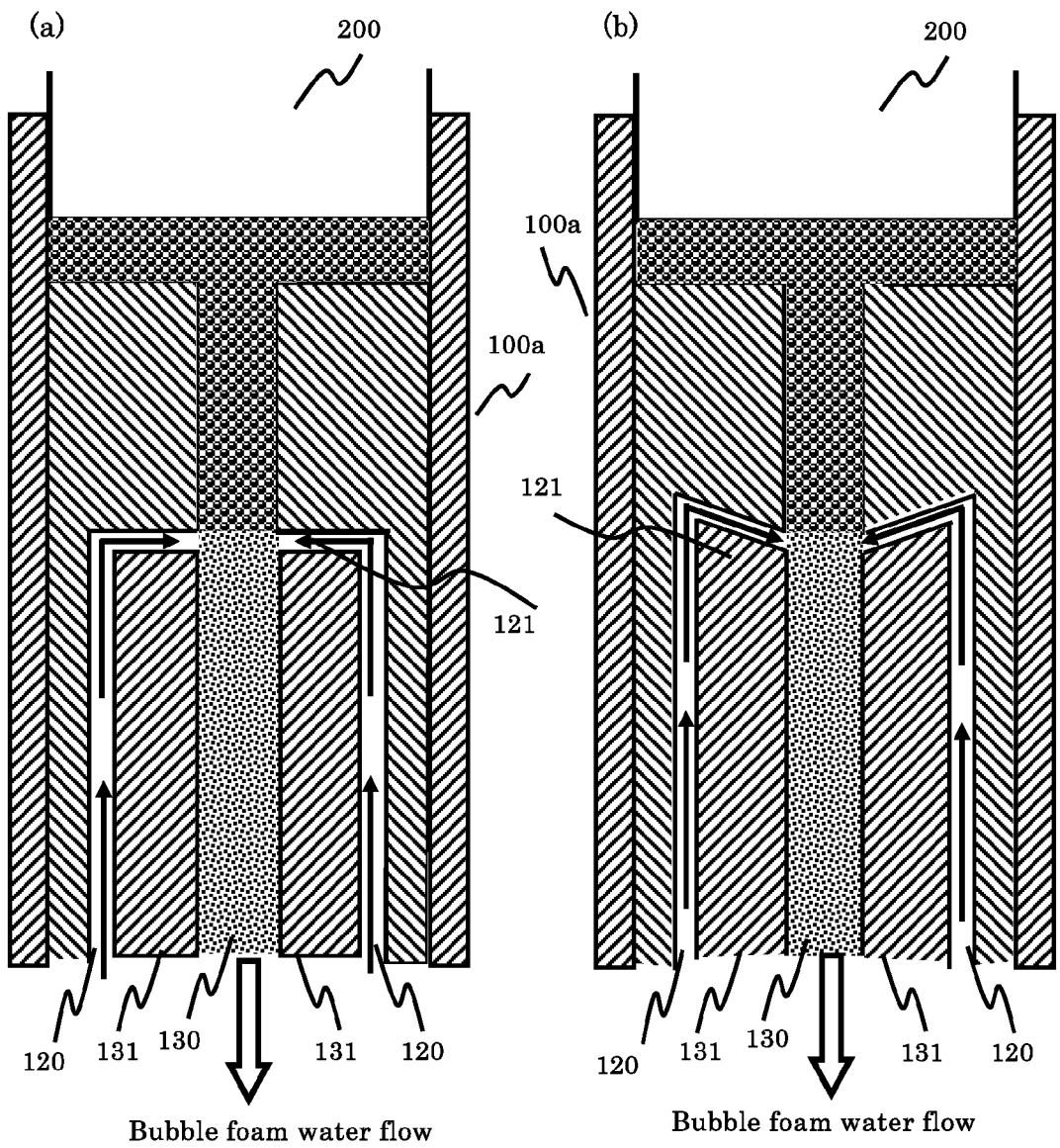
FIG. 9 is a schematic view of the configuration including the ventilation pass skew adjusting mechanism (part 1).

FIG. 9 is a schematic view of the configuration including the ventilation pass skew adjusting mechanism. In this configuration, the installation skew of the air intake holes 121 can adjustable.

In FIG. 9, the water flow after turning to the bubble foam water flow is hatched with fine hatching finer than the hatching hatched to the water flow before turning to the bubble foam water flow.

The ventilation pass skew adjusting mechanism can adjust the skew of the ventilation pass 120 to the side surface of the water flow cylinder 130 and adjust the skew of the air flow jet to the air cavity 131.

The method for adjusting the installation skew of the ventilation pass 120 to the side surface of the water flow cylinder 130 is not limited. In this configuration, the ventilation pass skew adjusting mechanism can adjust the relative skew of the objects forming the ventilation pass 120.

In FIG. 9(*a*), the skew of the ventilation pass 120 relative to the side surface of the water flow cylinder 130 and the accelerated water flow jet is adjusted to be 90 degrees. The air flow jetted from the air intake holes 121 is injected to the accelerated water flow at the right angle.

In FIG. 9(*b*), the skew of the ventilation pass 120 to the side surface of the water flow cylinder 130 and the accelerated water flow jet is adjusted to be larger than 0 degree and smaller than 90 degrees (it is 45 degrees in this configuration). The air flow jetted from the air intake holes 121 is injected into the accelerated water flow at 45 degrees.

Figure 10:
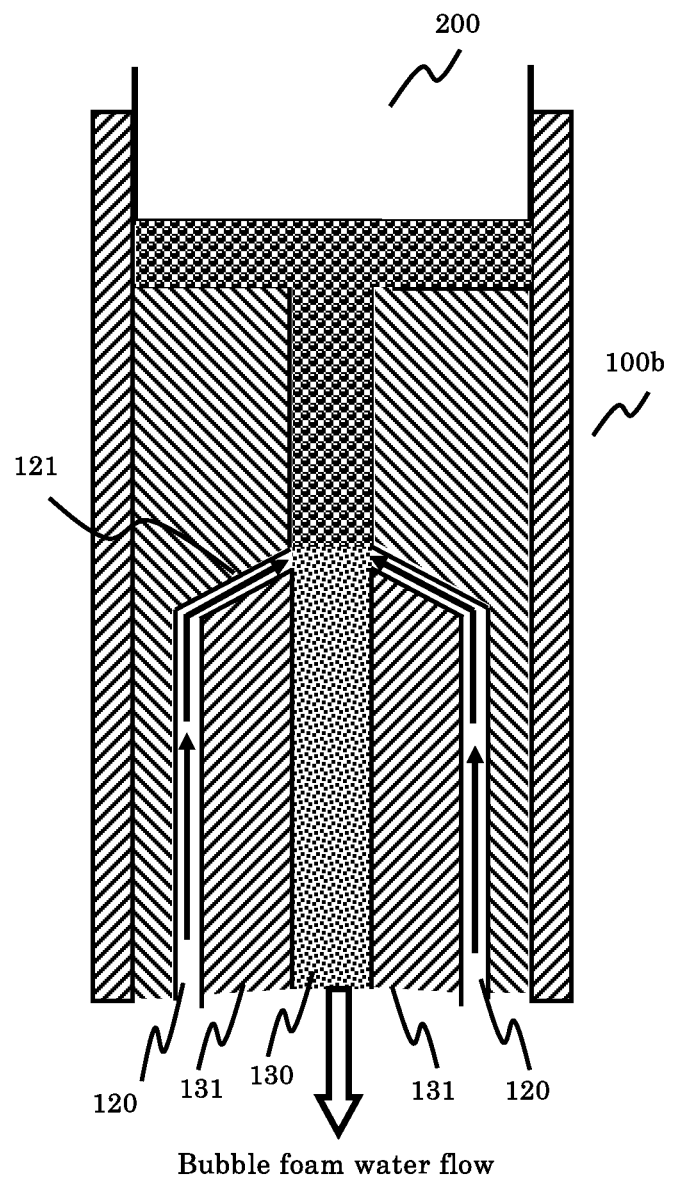
FIG. 10 is a schematic view of the configuration including the ventilation pass skew adjusting mechanism (part 2).

In FIG. 10, the skew of the ventilation pass 120 relative to the side surface of the water flow cylinder 130 and the accelerated water flow jet is adjusted to be larger than 90 degree and smaller than 180 degrees (it is 135 degrees in this configuration). The air flow jetted from the air intake holes 121 is injected into the accelerated water flow at 135 degrees.

As shown above, the velocity and the skew of the air flow injected to the accelerated water flow jet can be adjusted by adjusting the skew of the air flow jet. As a result, the amount of the bubble and the size of the bubble mixed in the accelerated water flow jet can be controlled.

The amount and the size of the bubble mixed into the accelerated water flow jet depend on other conditions such as the amount of the water in the accelerated water flow jet, the velocity of the accelerated water flow jet, the width and the height of the air cavity 131 and the width of the air intake holes 121. Taking these conditions into account, the skew of ventilation pass 120 is adjusted with the ventilation pass skew adjusting mechanism, and as a result, the amount and the size of the bubble mixed into the accelerated water flow jet can be adjusted.

(Embodiment 3)

The water saving aerator 100*b* shown in this embodiment 3 is a configuration that comprises a decelerator for decelerating the speed of the accelerated water flow jet accelerated by the accelerator and for adjusting the speed of the bubble foam water flow at the lower stream.

Figure 11:
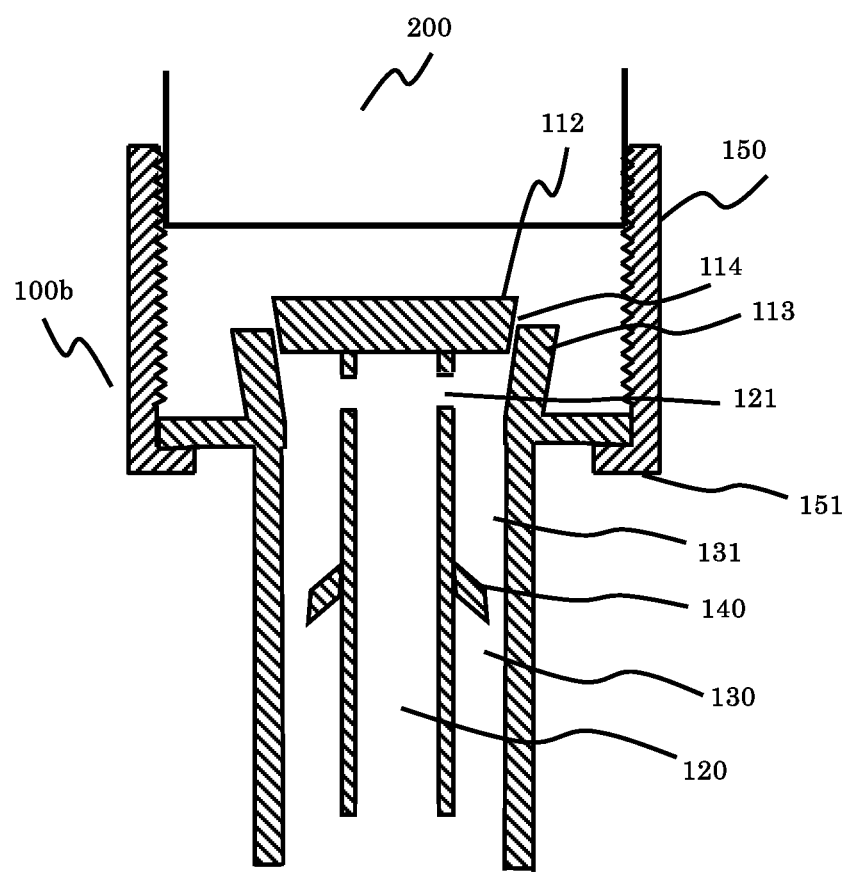
FIG. 11 is a schematic view of the water saving aerator 100b of the present invention in embodiment 3.

FIG. 11 is a schematic view of the water saving aerator 100*b* of the present invention in embodiment 3. In this configuration, the water saving aerator 100*b* further comprises the decelerator 140 in addition to the configuration shown in FIG. 3 to FIG. 5 of embodiment 2.

The water saving aerator 100*b* comprises the water flow forming portion 110, the water flow accelerator 111, the ventilation pass 120, the air intake holes 121, the water flow cylinder 130, and the air cavity 131, in addition to the decelerator 140. In FIG. 11, the components such as the water flow forming portion 110, the water flow accelerator 111, the ventilation pass 120, the water flow cylinder 130, and the air cavity 131 are shown in the cross-section view for ease of understanding. These are the solid of revolution shape, but the air intake holes 121 are arrayed around the side surface of the water flow cylinder 130 appropriately, and it is not the solid of revolution shape.

In this embodiment 3, the water flow forming portion 110, the water flow accelerator 111, the ventilation pass 120, the air intake holes 121, the water flow cylinder 130 and the air cavity 131 are the same as those shown in embodiment 1 and embodiment 2, so the explanation is omitted in this embodiment 3.

The decelerator 140 can decelerate the velocity of the water flow jet. The configuration of the decelerator 140 is not limited. In this embodiment, the decelerator 140 is a water diffuser.

The decelerator 140 is a plate shape diffuser object such as a circular frusto-conical shape installed from the center side surface of the water flow cylinder 130 to extend in the peripheral direction. In this configuration, the decelerator 140 is formed as one object united with the water flow cylinder 130 for decreasing the number of parts.

In this configuration, the decelerator 140 is installed at the position where the water flow jet hits in the water flow cylinder 130. The decelerator 140 as a diffuser is installed by adjusting its position and skew for being hit by the water flow jet jetted downstream as bubble foam water flow mixed with the bubbles generated by being accelerated by the water flow accelerator 111 of the water flow forming portion 110 and passing through near the air intake holes 121. In this configuration, the decelerator 140 as a diffuser is installed with a certain skew. The bubble foam water flow hits and bounds on the decelerator 140 to the peripheral direction, and the speed of the bubble foam water flow is decelerated. The bubble foam water flow flushes from the water flow cylinder 130 passing through the gap 141 formed around the periphery of the decelerator 140.

The decelerator 140 decelerates the accelerated water flow jet, the configuration of the decelerator 140 is not limited. However, when the processing time for generating the bubble foam water flow, and decelerating the bubble foam water flow becomes long, the number of bubbles disappearing from the bubble foam water becomes large. Therefore, the decelerator 140 is enough for decelerating the speed of the bubble foam water flow appropriately. It is preferable that the processing time is short.

Figure 12:
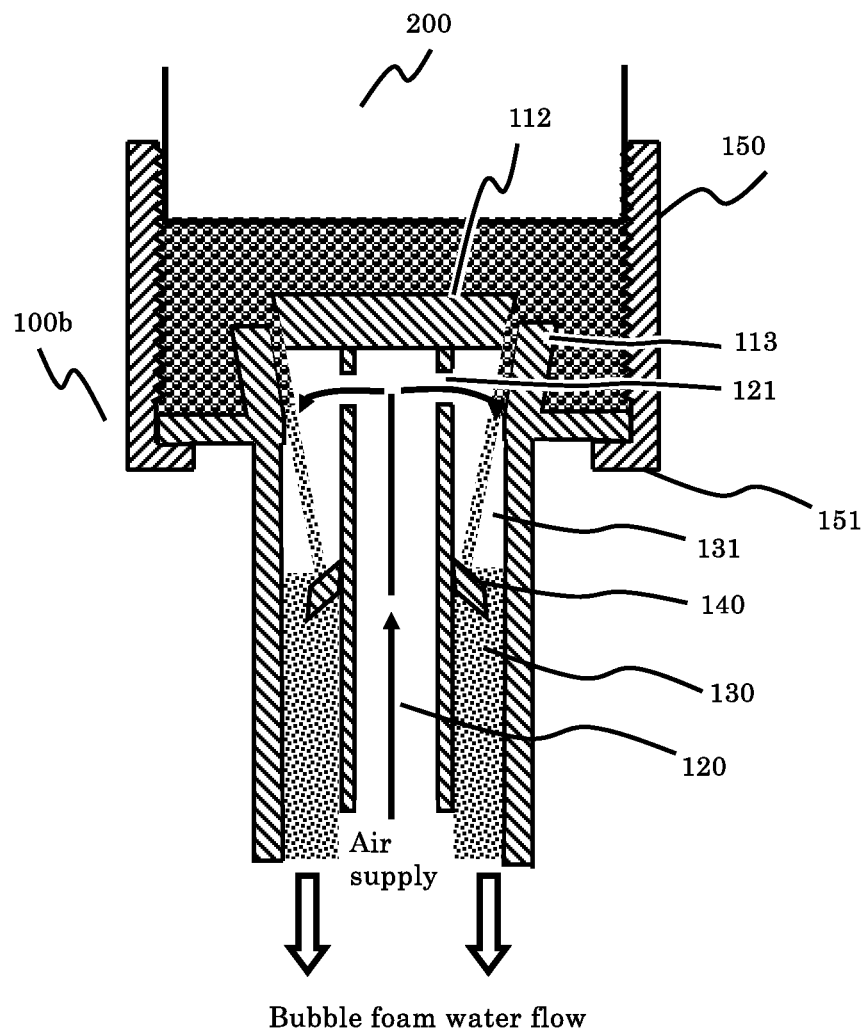
FIG. 12 is a schematic view showing the bubble foam water flow that is generated by flowing the water through the structure of the present invention in embodiment 3.

FIG. 12 is a schematic view showing that the bubble foam water flow is generated by flushing the water through the structure shown in FIG. 11 in embodiment 3.

In FIG. 12, the water flow after turning into the bubble foam water flow is hatched with fine hatching finer than the hatching used for the water flow before turning into the bubble foam water flow.

As shown in FIG. 5 described in embodiment 2, the accelerated water flow jet accelerated by the water flow forming portion 110a formed as the gap 114 between the circular truncated cone shape object 112 and the inverted cone shape cylinder 113 is jetted into the air cavity 131, and the air flow jet is injected to the accelerated water flow jet when passing in front of the air intake holes 121, then the water flow jet turns to be the bubble foam water flow. In this configuration shown in embodiment 3, there is the decelerator 140 as the diffuser in the place where the jet of bubble foam water flow hits, and the bubble foam water flow is decelerated by hitting and rebounding from the diffuser. In this configuration, the bubble foam water flushes out from the gap between the decelerator 140 as the diffuser and the water flow cylinder 130 without staying in the water saving aerator 100b for too long a time, and as a result, the bubble foam water flow flushes as a gentle stream.

According to the water saving aerator 100b of the embodiment 3 of the present invention, high quality bubble foam water flow can be obtained.

As shown above, the water saving aerator can be used as the water saving apparatus and the bubble foam water generator. The water saving aerator can be applied to various apparatus not is limited in its use. For example, it can be applied to the water tap not only for commercial use but also for special use such as laboratory use, the special water delivery pipe such as the water delivery pipe for eye-washing water tap in a pool facility and the shower head.

While some preferable embodiments of the water saving aerator according to the present invention are described above, it should be understood that various changes are possible, without deviating from the technical scope according to the present invention. Therefore, the technical scope according to the present invention is limited only by the claims attached.

INDUSTRIAL APPLICABILITY

The water saving aerator according to the present invention can be used as the water saving apparatus and the bubble foam water generator. The water saving aerator can be applied to various apparatus not limited for its use. For example, it can be applied to the water tap not only for commercial use but also for special use such as laboratory use, the special water delivery pipe such as the water delivery pipe for eye-washing water tap in a pool facility and the shower head.

The invention claimed is:

1. A water saving aerator adapted to be attached to a water tap for generating bubble foam water and flowing the bubble foam water, comprising;
    a water flow forming portion for forming a water flow through the water saving aerator;
    a water flow accelerator for accelerating the water flow supplied from the water flow forming portion and jetting an accelerated water flow jet downwardly;
    a water flow cylinder through which the accelerated water flow flows;
    an air cavity disposed in the water flow cylinder within a space for the water flow, the width of the air cavity being larger than that of the accelerated water flow jet, the air cavity containing air while the water flushes into it;
    a water deflection part on an inner side surface of the water flow cylinder, the water deflection part being hit by the accelerated water jet obliquely and downwardly and deflecting the accelerated water jet obliquely and downwardly, and diffusing the accelerated water jet to fill the water flow cylinder; and
    a ventilation pass for supplying outer air to the air cavity via air intake holes to the air cavity;
    wherein the accelerated water flow jet accelerated by the water flow accelerator is jetted into the air contained in the air cavity disposed in the water flow cylinder, and the bubble foam water flow is generated by injecting the air into the water flow.

2. The water saving aerator according to claim 1, wherein air pressure of the air cavity is decreased by the accelerated water flow jet jetted into the air in the air cavity flowing out downstream so that the air cavity keeps on being filled with the air by drawing air from the air intake holes to the air cavity.

3. The water saving aerator according to claim 2, further comprising an accelerated water flow jet position adjusting mechanism for adjusting a distance between the air intake holes and the accelerated water flow jet jetted into the air cavity.

4. The water saving aerator according to claim 2, further comprising an accelerated water flow jet skew adjusting mechanism for adjusting a jet skew of the accelerated water flow jet jetted into the air cavity.

5. The water saving aerator according to claim 2, further comprising an air intake hole size adjusting mechanism for adjusting a width of the air intake holes and adjusting the velocity of the air flow jet jetted via the air intake holes, wherein velocity of the air jetted into the accelerated water flow jet can be adjusted.

6. The water saving aerator according to claim 1, wherein a skew of the ventilation pass relative to the accelerated water flow jet is larger than 0 degree and smaller than 90 degrees.

7. The water saving aerator according claim 1, wherein a skew of the ventilation pass relative to the accelerated water flow jet is larger than 90 degree and smaller than 180 degrees.

8. The water saving aerator according to claim 1, further comprising a ventilation pass skew adjusting mechanism for adjusting a skew of the ventilation pass relative to the accelerated water flow jet.

9. The water saving aerator according to claim 1, further comprising a water flow cylinder width adjusting mechanism for adjusting the width of the water flow cylinder so that the width of the accelerated water flow jet is controlled.

10. The water saving aerator according to claim 1, further comprising a decelerator for decelerating the speed of the accelerated water flow jet accelerated by the accelerator and for leading downwardly so that the speed of the flow of the generated bubble foam water is adjusted.

11. The water saving aerator according to claim 1, wherein a plurality of accelerated water flow jets generated by the water flow forming portion and the accelerator are present.

12. The water saving aerator according to claim 1, wherein the water flow cylinder does not comprise an obstruction that obstructs and stops the downward flow of the accelerated water.

* * * * *